Patented Apr. 22, 1930

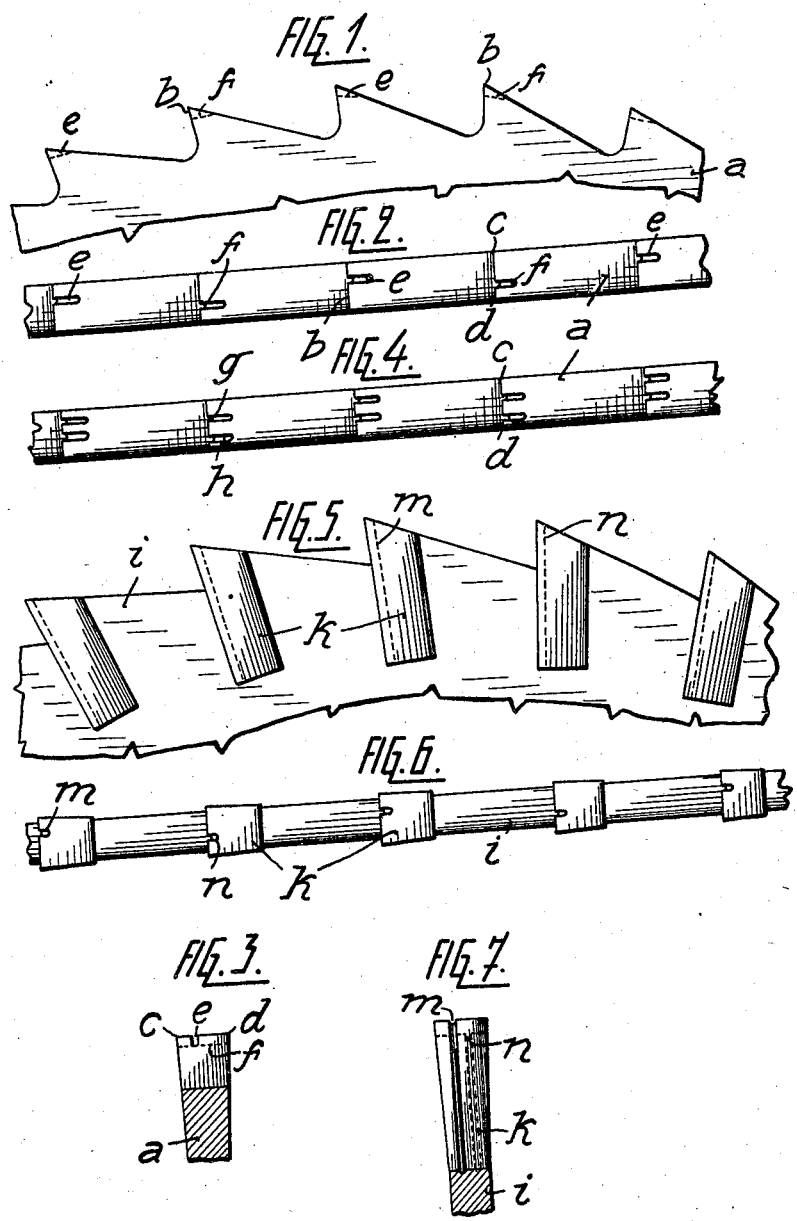

1,755,717

UNITED STATES PATENT OFFICE

KARL WAGNER, OF REUTLINGEN, GERMANY

SAW

Application filed June 21, 1926, Serial No. 117,584, and in Germany July 31, 1925.

With rotary metal saws, in order to obtain the greatest possible speed in working, in conjunction with the greatest economy as regards the tool and the lowest expenditure of power, it has already been customary so to arrange the teeth that they are either bent over alternately to the left and to the right, or so that a portion of the teeth extends somewhat higher whilst being somewhat narrower than the other teeth, or these higher teeth may be ground with an inclined or roof like portion.

The object of the foregoing arrangement is that by reason of the diminution of the cutting width of the individual teeth an easier penetration into the work piece is obtained, and the shavings produced by the individual teeth are easily removed. At the same time, the smoothest possible cutting surfaces are produced together with the greatest output.

The above mentioned and similar constructions are expensive to manufacture, troublesome to sharpen and have the particular drawback that in the case of at least half the teeth, one corner of the tooth is missing, and consequently lost for cutting the incision. For instance, in the case of a saw disk provided with alternate bevelled teeth, only in respect of each second tooth the corner point at the right or at the left will be retained. With only one half of the corners of the cutting edges and one half of the length of the latter, the incision has to be worked to the proper width. These corners and short cutting edges are therefore subject to relatively quick wear.

In cases where the saw is provided with full and unbroken cutting edges or with teeth of the full width quick and clean work cannot be depended upon, because the saw dust or shavings corresponding to the whole width of the tooth are removed with difficulty and only with great lateral friction on the sides of the work piece, since saw dust or shavings when removed from the cut will no longer be of such compactness as when in the work piece. In other words the saw-dust or shavings increase both in volume and in width. Owing to the lateral friction of the saw dust within the work piece there will be required a somewhat greater expenditure of power with the production of finer metallic dust, which dust particularly tends to attack the corners of the cutting edges. The result of this is that with the saw disks the corners of the cutting edges wear away very rapidly in comparison to the cutting edges themselves.

According to the principle of the invention, the cutting tool of the class in question is so arranged that the dust or shavings coming from the side surfaces of the cut in the work piece are removed towards the inside, so that there will be no friction between the shavings or dust and the surfaces of the cut, the result being that unnecessary losses of power will be avoided and cutting greatly facilitated.

In carrying out the invention grooves or gaps are provided in the cutting edges of the teeth in the neighborhood of the corners of the cutting edges, said grooves or gaps being displaced alternately towards one and the other side, the result being that the material forming shavings or dust can expand both as to width and volume and obtain access to the spaces thus produced, thus avoiding any lateral friction of the shavings or dust on the surface of the work-piece. Every tooth is still provided with both its corners on the cutting edges. The total length of the cutting edge will thus be practically retained, and the resistance to cutting at the corners of the cutting edges is only one half of the value than in the previous case.

The grooves or gaps in the cutting edges of the individual teeth are suitably staggered with respect to one another as shown in Figs. 2, 4 and 6, and in consequence thereof, each tooth removes material which had not been removed by the preceding tooth.

Saw disks constructed according to my invention as compared with those of ordinary construction have been found to possess the advantages that they are cheaper to manufacture, that their construction will be simplified and that they may be sharpened more conveniently.

In the case of saw discs with teeth which form separate pieces to the saw disc, the grooves or gaps can be provided in the cutting edges in such a manner that they extend longitudinally on the front surfaces of the teeth to such depth that they will remain after sharpening the teeth.

The drawing illustrates various constructional embodiments of cutting tools manufactured according to the invention.

Figs. 1, 2 and 3 are fragmentary views of a saw disk $a$ with the teeth each provided with a groove or gaps, the views being a side elevation, a plan and a section respectively.

It will be seen that the grooves or gaps $e$ and $f$ are near to the respective corners $c$ and $d$ of the cutting edge $b$ of the tooth, and that they are arranged alternately towards opposite sides.

Fig. 4 is a plan of a saw disk $a$ similar to Fig. 1, having a plurality of grooves or gaps provided on the cutting edges of the teeth.

In this case two grooves $g$ and $h$ are provided on the cutting edge of each tooth between the corners $c$ and $d$. These grooves are so arranged or distributed that they are displaced with respect to one another in alternate pairs.

Figs. 5, 6 and 7 show a saw disk $i$ with teeth $k$ of the form of separate pieces attached to the saw, the views being a side elevation, a plan and a section respectively. The teeth $k$ are fixed on the saw disk $i$ in any known manner, for instance by means of slots and keys. The grooves $m$ and $n$ on the front portion of the tooth may be single or double according to the thickness of the saw disk, and the grooves in one tooth are staggered or displaced with respect to the grooves in the other teeth.

I claim:

1. A saw, having teeth consisting of separate pieces attached to the saw, said teeth having their cutting edges interrupted by grooves to permit removal of the shavings coming from the side surfaces of the cut in the workpiece in inward direction of the saw, said grooves being milled into said teeth longitudinally of the entire front thereof and being of such depth that after subsequent grinding of the teeth the grooves will still remain at the cutting edges.

2. In a saw, teeth having their cutting edges interrupted by grooves to permit removal of the shavings coming from the side surfaces of the cut in the work-piece, said grooves being milled into said teeth longitudinally of the entire front thereof and being of such depth that after subsequent grinding of the teeth the grooves will still remain at the cutting edges.

In testimony whereof I affix my signature.

KARL WAGNER.